United States Patent [19]

Cavalli et al.

[11] Patent Number: 5,108,976

[45] Date of Patent: Apr. 28, 1992

[54] HIGH-DENSITY AND MEAN-POROSITY CATALYST SUPPORTED ON A SILICEOUS MATRIX, BASED ON VANADIUM, IRON, OXYGEN AND ALKALI METAL

[75] Inventors: Luigi Cavalli, Novara; Renzo Nardini, Vercelli, both of Italy

[73] Assignee: Ausimont S.r.l., Milan, Italy

[21] Appl. No.: 593,376

[22] Filed: Oct. 1, 1990

Related U.S. Application Data

[63] Continuation of Ser. No. 297,335, Jan. 17, 1989, abandoned.

[30] Foreign Application Priority Data

Jan. 18, 1988 [IT] Italy ............................... 19098A/88

[51] Int. Cl.⁵ .................... B01J 23/92; B01J 23/84; B01J 23/78; C01B 17/68
[52] U.S. Cl. ........................... 502/247; 502/22; 502/25; 502/26; 502/242; 502/243; 423/535
[58] Field of Search .................... 502/20-26, 502/84, 243, 247, 242; 423/535

[56] References Cited

U.S. PATENT DOCUMENTS

| | | |
|---|---|---|
| 1,880,678 | 10/1932 | Beardsley et al. .................. 502/243 |
| 2,029,376 | 2/1936 | Joseph .................. 423/535 |
| 3,186,794 | 6/1965 | Davies .................. 423/535 |
| 4,064,072 | 12/1977 | Bushick .................. 252/404 |
| 4,155,875 | 5/1979 | Yamaguchi et al. .................. 502/26 |
| 4,284,530 | 8/1981 | Sherif .................. 423/535 |
| 4,410,450 | 10/1983 | Sasaki et al. .................. 502/215 |
| 4,485,190 | 11/1984 | Sherif .................. 502/243 |

FOREIGN PATENT DOCUMENTS

| | | |
|---|---|---|
| 1190249 | 7/1985 | Canada . |
| 0088294 | 9/1983 | European Pat. Off. . |
| 0151823 | 8/1985 | European Pat. Off. . |
| 972402 | 10/1964 | United Kingdom . |
| 1520336 | 8/1978 | United Kingdom . |
| 1520709 | 8/1978 | United Kingdom . |

OTHER PUBLICATIONS

Journal of Catalysis, vol. 43, 1976, pp. 243–251, Hassan et al.: "Catalytic and surface characteristics of newly imported, exhausted, and regenerated V2O5 catalysts used in H2SO4 manufacturing".

Ind. Eng. Chem. Prod. Dev., 1981, 20, 439–450, Neimark et al., "Theory of Preparation of Supported Catalysts".

Primary Examiner—Paul E. Konopka
Attorney, Agent, or Firm—Morgan & Finnegan

[57] ABSTRACT

A high-density and mean-porosity catalyst, supported on a siliceous matrix, based on vanadium, iron, oxygen and alkali metals, wherein the $V_2O_5$ content ranges from 6 to 9% by weight, the $Me_2O$ content ranges from 8.5 to 12% by weight (Me being an alkali metal), the particle density ranges from 1.10 to 1.40 g/cm³ and furthermore:

the pore volume ranges from 0.20 to 0.70 cm³/g and the surface area ranges from 0.30 to 5 m²/g, the average radius of the pores ranging from 600 to 2200 nanometers;

the $SiO_2$ content is lower than 75% by weight and the $Fe_2O_3$ content is higher than 0.90% by weight.

33 Claims, No Drawings

HIGH-DENSITY AND MEAN-POROSITY CATALYST SUPPORTED ON A SILICEOUS MATRIX, BASED ON VANADIUM, IRON, OXYGEN AND ALKALI METAL

This is a continuation of co-pending application Ser. No. 07/297,335, filed on Jan. 17, 1989, now abandoned.

BACKGROUND OF THE INVENTION

The catalysts based on vanadium, supported on a siliceous matrix, are commonly utilized for the oxidation of sulphur dioxide to sulphur trioxide; see for example British patent Nos. 808,630; 898,985; 972,402 and 1,520,336; U.S. Pat. Nos. 3,448,061 and 4,485,190 and European patent Nos. 47,540 and 151,823, the contents of which is an integral part of the present description. As a siliceous matrix, use was made so far of diatomaceous earth and of finely subdivided silica gel; but good results are obtainable also with alpha quartz (cristobalite), silicalites, vanadium silicalites or titanium silicalites. As to the meaning of these terms, reference is made to Italian patent publication 22,220 A/87 and to British patent No. 2,024,790. These catalysts can be approximately represented by the raw formula (I):

$$V_x K_y Na_z O_w S_t \quad (I)$$

where x, t, w, z and t are broadly varying indexes (depending on the operative conditions and on the ageing degree) and where z can also be zero. Also iron (Fe) and other elements (Cs, Al, Mn, Mg and so on) are often present. Still further elements (As, Cl, F, Se and so on), even if in a very low amount, surely act as poisons for this catalysis. The catalyst, utilizable in both fixed and fluidized beds, contains vanadyl-alkali metal sulphates and pyrosulphates, the concentration of which varies as a function of time. The yields obtainable with these catalysts are high, especially if use is made of a series of more catalyst layers (at least 3 or 4) of the axial or radial type. Generally the catalyst is prepared by impregnating a diatomaceous earth or a different siliceous carrier (average diameter = about 1 to 40 micrometers), with an aqueous solution of soda (NaOH) and of potassium metavanadate ($KVO_3$) and/or ammonium metavanadate ($NH_4VO_3$). Whereafter the earth is thickened, for example with carboxymethyl cellulose (CMC) or with a polyacrylamide. The paste is then extruded, thereby obtaining particles of different shape (hollow or solid cylinders, polylobed cylinders, optionally having helical grooves and so on). Prior to use, the catalyst is activated by a $SO_2$ stream and a final activation is carried out by the same process fluid, containing $SO_2$, $SO_3$, $O_2$ and $N_2$, at the reaction temperature (350°–650° C.). During the oxidation of $SO_2$ to $SO_3$ the activated material is in the form of a liquid film on the surface of the carrier's pores. The average life of these catalysts is between 5 and 10 years with a gradual decrease to the vanadium content (for instance from about 7% to about 5% by weight). The possibility of regenerating and reusing the exhausted catalyst would be, therefore, an advantage of great importance for the industry. So far, however, it was not possible to carry into effect any of the alternatives.

According to a first alternative [see Journal of Catalysis 43, 243–251 (1976)], the exhausted catalyst should be attacked with a strong acid (HCl), capable of solubilizing the vanadium. The same vanadium should be recovered by extraction. This plan was not carried into effect, because the insoluble siliceous gangue did tenaciously retain a non-negligible vanadium content. The difficulties connected with a separation from the gangue have proved so far insurmountable, at least from an industrial viewpoint.

A second alternative (see again the above-cited article in the Journal of Catalysis) comprises a strong heating of the exhausted catalyst (at 500° C.), to remove arsenic and other poisons, followed by a grinding of the calcination residue. It is then necessary to knead the ground catalyst with sulphur and with a solution of ammonium sulphate, whereafter an activation with air at 750°–800° C. is carried. However, this method too is not free from drawbacks. The mechanical resistance (to compression), the resistance to ageing and the abrasion resistance are not fully satisfactory. Furthermore, the $SO_2$ conversion yields are often unacceptably decreasing.

A last alternative is to re-use an exhausted catalyst having a very high silica content (higher than 80% by weight). In such a case, however, as a consequence of a too prolonged exploitation of the catalyst, a consirable amount of the catalytic activity is irremediably lost.

The Applicant has now perfected an excellent catalyst, which does not exhibit the abovesaid shortcomings and can be prepared in an utmost simple and rapid way, starting from a previously exploited and already exhausted catalyst.

DISCLOSURE OF THE INVENTION

In one form, the invention relates to a high-density catalyst, supported on a siliceous matrix, based on vanadium, iron, oxygen and alkali metals, in which the $V_2O_5$ content ranges from 6 to 9% by weight, the $Me_2O$ content ranges from 8.5 to 12% by weight (Me being an alkali metal and in particular potassium), the particle density (see standards ASTM-D-3766-83a) ranges from 1.10 to 1.40 (preferably from 1.10 to 1.35) g/cm³. Furthermore:

the volume of the pores is from 0.20 to 0.70 cm³/g (preferably from 0.30 to 0.70 cm³/g) and the surface area is from 0.30 to 5 m²/g (preferably from 0.50 to 3 m²/g), the average radius of the pores being from 600 to 2200 and preferably from 650 to 1000 nanometers; and the $SiO_2$ content is equal to or lower than 75% and preferably lower than 60% by weight and the $Fe_2O_3$ content is equal to or higher than 0.90% by weight.

The presence of a relatively high iron content proves the origin from exhausted catalysts (used as a raw material), in which iron accumulates (iron comes from the corrosion of the apparatus). To calculate the average radius of the pores, the following formula is taken into account:

$$R = 2V/S \times 1000 \text{ (nanometers)},$$

wherein V is the volume of the pores (cm³/g) and S is the surface area (m²/g).

This catalyst can be prepared in an exceptionally rapid and simple way, by grinding an exhausted catalyst of the same type, having a silica content equal to or lower than 75% and preferably lower than 60% by weight (coming from a pre-existing plant for the oxidation of sulphur dioxide to sulphur trioxide), until the average particle size ranges from 1 to 50 (preferably from 5 to 40) micrometers and by adding an impregnating aqueous solution, containing a balancing amount of those catalytic elements, the lack of which made unemployable (exhausted) the previously used catalyst. Before adding the solution it is possible to mix the ground catalyst with little amounts of fresh diatomaceous earth, up to a maximum amount of 60% and preferably 50% by weight, on the whole catalyst. As an alternative to the diatomaceous earth it is possible to use silicalites, titanium silicalites, vanadium silicalites or alpha quartz, provided, of course, the final $SiO_2$ content in the catalyst does not exceed 75% and preferably 60% by weight. Excellent results have been obtained by adding said solution according to the technology known as "dry impregnation" described, for instance, in Ind. Eng. Chem. Prod. Res. Dev.; vol. 20, page 441 (1981). See also European patent Nos. 47,540 and 151,823. As an alternative, the solution can be added before and/or after grinding, according to a technology known as "co-mulling" (see U.S. Pat. Nos. 4,444,742 and 4,444,908).

The new catalysts lead to an unexpected result. In fact, after a normal activation (first with $SO_2$, then with the process gases), they substantially exhibit—mass and temperature being the same—the catalytic activity of a fresh catalyst. This permits to charge into the reactors amounts of catalyst which are much higher (even by 20%) with respect to the run with a fresh catalyst, which results in an increased conversion, without extending in any way the volume and/or the geometry of the reactors.

The invention can be carried out according to different modalities. For merely indicative purposes, a few details are cited hereinafter:

the preferred alkali metal is potassium;

as a water-soluble compound of vanadium it is possible to use potassium, sodium or ammonium metavanadate, vanadium anhydride ($V_2O_5$) and analogous compounds;

as a water-soluble compound of potassium it is possible to use potassium hydrate, oxalate, oxide, carbonate, bicarbonate, sulphate and bisulphate, potassium metavanadate ($KVO_3$) and analogous compounds;

as a water-soluble compound of sodium it is possible to use sodium hydrate, oxalate, carbonate, bicarbonate, sulphate and bisulphate, sodium metavanadate ($NaVO_3$) and analogous compounds;

as an alkali metal, also caesium (besides K and Na) can be present;

besides the basic elements (V, K, Na, O, Fe) also a synergistic amount of titanium can be present;

thickening (by means of a carboxymethyl cellulose or of a polyacrylamide) can be carried out in one step or in more steps and can be preceded by an additioning with a pore-forming agent (blowing agent), preferably selected from starch and ammonium phosphates (preferably diammonium phosphate), and optionally with $H_2O$;

the catalyst can be shaped (pelletized) in the form of hollow or solid cylinders or of poly-lobed cylinders, optionally showing helical grooves and so on, the shaping being followed by drying and activating calcination, in the presence of $SO_2$, at a temperature generally ranging from 270° to 600° C.

EXAMPLES

The following examples better illustrate the invention, without being however a limitation of the scope thereof.

EXAMPLE 1 (FRESH CATALYST; REFERNCE EXAMPLE)

This example describes the usual preparation of a catalyst for the manufacture of $SO_3$, using fresh diatomaceous earth as a raw material. To 1 kg of earth, having a $SiO_2$ content equal to 87.13% by weight and marketed by DIATOM Company under the trade name Diatom 135C, there were added, under stirring, in a kneading machine equipped with sigmablades, 0.433 liters of a potassium vanadate solution (titer=280 g/liter of $V_2O_5$). After 15 minutes there were added 0.17 l of concentrated sulphuric acid (density=1.54 g/cm$^3$). Stirring was carried on for further 15 minutes, whereafter to the paste there were added 126 g of carboxymethyl cellulose powder (CMC) and 930 g of an aqueous solution of CMC at 3% by weight. The paste was extruded in a piston extruder, thereby obtaining (solid) cylinders having a diameter of 4 mm and a height of 5-6 mm. The resulting product was dried at 120° C. for 12 hours and then activated at 450° C. for 1 hour by simultaneously conveying a $SO_2$ stream at 270° C. The thus prepared catalyst exhibited the following weight composition:

$V_2O_5$=7.84%
$SO_3$=20.85%
$K_2O$=10.95%
$Na_2O$=1.37%
$SiO_2$=lower than 59% and the following physical properties: surface area=1.05 m$^2$/g; particle density=0.86 g/cm$^3$; actual density=2.41 g/cm$^3$; volume of pores=0.784 cm$^3$/g.

EXAMPLE 2 (HIGH-DENSITY REGENERATED CATALYST)

This example describes a method of preparing a catalyst by impregnating a preceding and already exhausted catalyst with a solution of potassium metavanadate in such an amount as to bring the concentration values of vanadium and of potassium to the levels of a fresh catalyst. The starting exhausted catalyst, sampled after the discharge from an industrial converter, exhibited the following weight composition:

$V_2O_5$=7.00%
$SO_3$=21.24%
$K_2O$=9.50%
$Na_2O$=0.93%
$SiO_2$=lower than 60% and the following physical characteristics: surface area=1.66 m$^2$/g; particle density=1.08 g/cm$^3$; actual density=2.40 g/cm$^3$; volume of pores=0.51 cm$^3$/g.

1 kg of said exhausted catalyst was ground until obtaining a powder (having a marked tendency to caking), the particles of which had an average diameter below 50 micrometers. To the thus obtained powder there were added, under stirring in a kneader, 75 g of a potassium vanadate solution (titer=305.8 g/liter of $V_2O_5$; density=1.55 g/liter) diluted to 150 cm$^3$ with $H_2O$. Stirring went on for 15 minutes, whereafter 30 g of a polyacrylamidic thickening agent, manufactured by MONTEFLUOS and marketed under the trade name Ecoclar 8008 (as a powder), and 480 g of an aqueous solution of said Ecoclar 8008 (concentration=15 g/liter) were added. The product was then extruded, dried and activated according to the modalities of Example 1. The resulting catalyst exhibited the following weight composition:

$V_2O_5$=7.88%

$K_2O = 10.80\%$
$Na_2O = 0.90\%$
$SO_3 = 22.93\%$
$SiO_2 = $ about 56%
$F_2O_3 = 1.45\%$ and the following physical characteristics: surface area=0.76 m$^2$/g; particle density=1.31 g/cm$^3$; actual density=2.41 g/cm$^3$; volume of pores=0.304 cm$^3$/g.

For the activity tests use was made of a laboratory cylindrical reactor (surrounded by a thermostatic bath of molten salts), having an inside diameter of 42 cm and a height of 450 mm, equipped with a coaxial thermocouple. Into the reactor there were charged 80 g of regenerated catalyst (115 cm$^3$) and subdivided into ten layers of 8 g each, alternated with eleven layers of an inert material (calcined Al$_2$O$_3$) having a height of about 3 cm, in order to obtain a substantially isothermal profile of the reaction. Before being charged into the reactor, the catalyst was subjected to an activating grinding, thereby obtaining particles having an average size from 0.1 to 1 mm. The diffusional effects were pratically eliminated by said grinding.

Data and results are recorded on Table 1.

EXAMPLE 3

Example 2 was repeated, but the amount of catalyst charged into the reactor was brought to 120 g (140 cm$^3$).

Data and results are recorded on Table 1.

EXAMPLE 4 (COMPARATIVE TEST)

Example 2 was repeated, loading 80 g of exhausted not regenerated catalyst. Data and (unsatisfactory) results are recorded on Table 1.

EXAMPLE 5 (COMPARATIVE TEST)

This example illustrates the method of preparing a catalyst obtained by subjecting the exhausted catalyst to a heat-treatment according to the article in the Journal of Catalysis (1976) cited herein. Said heat-treatment was carried out to concentrate vanadium and potassium, bringing the values of said elements back to the values of the fresh catalyst.

A sample of exhausted catalyst, sampled after discharge from an industrial converter, exhibited the following weight composition:

| | |
|---|---|
| $V_2O_5 = 7.11\%$ | $SO_3 = 17.05\%$ |
| $K_2O = 10.20\%$ | $SiO_2 = $ about 65% |
| $Na_2O = 1.16\%$ | | and the following physical properties: surface area=3.03 m$^2$/g; particle density=0.62 g/cm$^3$; density=2.41 g/cm$^3$; volume of pores=1.20 cm$^3$/g.

The sample was heated in a muffle at 530° C. and maintained at this temperature for 24 hours, thereby obtaining a concentration of the active elements. The loss, at 100° C., was equal to 0.84% by weight (at 530° C. the loss was equal to 7.58%). After calcining, the sample was analyzed and the following values were found:

$V_2O_5 = 7.96\%$ by weight
$SO_3 = 8.94\%$ by weight.

To a sample of 1 kg of exhausted catalyst, treated at 530° C. as described above, there were added 1 g of Ecoclar 8008 and 600 g of a solution (15 g/liter) of Ecoclar 8008. The whole was mixed under stirring, extruded and then dried and activated according to the modalities of example 1. The catalytic test, carried out in accordance with the modalities of example 2, gave rise to the results recorded on Table 1, along with the characteristics of the finished catalyst. As it is clear from said Table 1, said 1976 method leads to a catalyst having too small pores, yielding less satisfactory performances in comparison with the catalyst of the invention.

EXAMPLE 6

Example 3 was repeated, adding starch as a blowing agent during the preparation of the catalyst; the obtained catalyst had the following physical characteristics: surface area=0.42 m$^2$/g; particle density=1.15 g/cm$^3$; average radius of pores=2190 nm; volume of pores=0.46 cm$^3$/g.

The oxidation yields of this catalyst were analogous with the yields obtained from the test of example 3.

TABLE 1

| Example | 2 | 3(*) | 4() | 5(**) |
|---|---|---|---|---|
| Initial V$_2$O$_5$(*) (%) | 7.00 | s.ex.2 | 7.00 | 7.11 |
| Initial K$_2$O (%) | 9.50 | " | 9.50 | 10.20 |
| Initial SO$_3$ (%) | 21.24 | " | 21.24 | 17.05 |
| Initial Na$_2$O (%) | 0.93 | " | 0.93 | 1.16 |
| Initial SiO$_2$ (%) | <60 | " | <60 | ca.65 |
| Particle density (g/cm$^3$) | 1.31 | 1.31 | 1.08 | 1.45 |
| Volume of pores (cm$^3$/g) | 0.304 | 0.304 | 0.510 | 0.28 |
| Radius of pores (nm) | 800 | 800 | 614.5 | 448 |
| Area (m$^2$/g) | 0.76 | 0.76 | 1.66 | 1.25 |
| Final SiO$_2$ (%) | ca.56 | ca.56 | <60 | ca.64 |
| Final Fe$_2$O$_3$ (%) | 1.45 | s.ex.2 | 1.43 | 1.46 |
| Final V$_2$O$_5$ (%) | 7.88 | " | 7.00 | 7.96 |
| Final K$_2$O (%) | 10.80 | " | 9.50 | n.d. |
| Final SO$_3$ (%) | 22.93 | " | 21.24 | 8.94 |
| Final Na$_2$O | 0.90 | " | 0.93 | n.d. |
| Amount (grams) | 80 | 120 | 80 | 80 |
| Amount (cm$^3$) | 115 | 140 | 140 | 150 |
| Operative conditions (SO$_2$ oxidation) | | | | |
| Total gas flow (N-liters/h) | 1350 | 1350 | 1350 | 1350 |
| SO$_2$ (% by volume) | 6% | 6% | 6% | 6% |
| O$_2$ (% by volume) | 10% | 10% | 10% | 10% |
| SO$_2$ yield (Mole-%): | | | | |
| at 450° C. | 30.8 | 29.2 | 16.10 | 1.35 |
| at 480° C. | 62.7 | 78.0 | 41.30 | 41.40 |
| at 520° C. | 76.6 | 86.7 | 66.11 | 71.25 |

(*)In the exhausted catalyst.
(**)Comparative test.
(***)After a long activation with the process flow in an industrial scale plant, the yield exceeded 99%, as for the fresh catalysts.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A high-density regenerated silica catalyst for the oxidation of sulphur dioxide to sulphur trioxide, comprising a catalyst supported on a siliceous matrix, based on vanadium, iron, oxygen and alkali metals (Me), wherein the V$_2$O$_5$ content ranges from 6 to 9% by weight, wherein the Me$_2$O content ranges from 8.5 to 12% by weight, wherein the particle density ranges from 1.10 to 1.40 g/cm$^3$ and wherein:

the volume of the pores ranges from 0.20 to 0.70 cm$^3$/g and the surface area ranges from 0.30 to 5

$m^2/g$, the average radius of the pores being from 600 to 2,200 nanometers;

the silica ($SiO_2$) content is from 56% to 75% by weight and the $Fe_2O_3$ content is from 0.90% to 1.45% by weight;

said catalyst being obtained by a process comprising:
a) grinding an exhausted catalyst comprising the catalyst to be obtained, but poorer as to catalytic elements, having a silica content lower than 75% by weight and a $Fe_2O_3$ content from 0.90% to 1.45% by weight until the average diameter of the particles is from 1 to 50 micrometers; and
b) impregnating the finely ground product from step (a) with an aqueous solution containing catalytic elements exhausted from the catalyst; and
c) obtaining the regenerated catalyst.

2. The catalyst of claim 1, having the shape of solid or hollow cylindrical pellets.

3. The catalyst of claim 1, having the shape of poly-lobed cylindrical pellets.

4. The catalyst of anyone of the preceding claims 1 or 2 or 3 further comprising the alkali metal caesium, together with another alkali metal.

5. The catalyst of claim 1, wherein the average radius of the pores ranges from 650 to 1,000 nanometers.

6. The catalyst of claim 1, wherein a fresh diatomaceous earth, in an amount up to 60% by weight on the whole catalyst, is added to the ground catalyst prior to impregnation.

7. The catalyst of claim 1, wherein impregnation is effected by conventional dry-impregnation technology.

8. The catalyst of claim 1, wherein impregnation is followed by thickening with thickening material.

9. The catalyst of claim 8, wherein thickening is preceded by adding a pore-forming agent.

10. The catalyst of claim 8, wherein thickening is followed by shaping, in the form of solid, hollow or poly-lobed cylindrical particles.

11. The catalyst of claim 10, wherein shaping is followed by drying and by calcining in the presence of $SO_2$, at temperatures from 270° to 600° C.

12. The catalyst of claim 1, wherein impregnation is effected by using an aqueous solution containing:
a) a water-soluble vanadium compound; and
b) a water-soluble potassium compound.

13. A catalyst according to claim 12, wherein said solution also contains a water-soluble sodium compound.

14. The catalyst of claim 12, wherein said solution also contains a water-soluble caesium compound or a pore-forming agent or a water-soluble titanium compound.

15. The catalyst of claim 12, wherein said vanadium compound is selected from potassium metavanadate and ammonium metavanadate.

16. The catalyst of claim 12, wherein said potassium compound is selected from potassium metavanadate and potassium bisulphate.

17. The catalyst of claim 1, wherein the particle density ranges from 1.10 to 1.35 $g/cm^3$.

18. The catalyst of claim 1, wherein the volume of the pores ranges from 0.30 to 0.70 $cm^3/g$.

19. The catalyst of claim 1, wherein the surface area ranges from 0.50 to 3 $m^2/g$.

20. The catalyst of claim 3, wherein the pellets have helical grooves.

21. The catalyst of claim 4, further comprising titanium.

22. The catalyst of claim 1, wherein the average diameter of the particles is from 5 to 40 micrometers.

23. The catalyst of claim 6, wherein the diatomaceous earth is an amount up to 60% by weight.

24. The catalyst of claim 6, wherein the diatomaceous earth is replaced by silicalites, titanium silicalites, vanadium silicalites or alpha-quartz.

25. The catalyst of claim 8, wherein thickening is effected by addition of carboxymethyl cellulose or of a polyacrylamide.

26. The catalyst of claim 25, wherein the polyacrylamide is hydrolized.

27. The catalyst of claim 9, wherein the pore-forming agent is selected from starch, ammonium phosphate, diammonium phosphate.

28. The catalyst of claim 27, wherein the pore forming agent includes water.

29. The catalyst of claim 10, wherein shaping is by extrusion.

30. The catalyst of claim 10, wherein the particles have helical grooves.

31. The catalyst of claim 12, wherein the vanadium compound is selected from $KVO_3$, $NaVO_3$ and $NH_4VO_3$.

32. The catalyst of claim 12, wherein the water-soluble potassium compound is selected from potassium hydroxide, oxide, oxalate, carbonate, bicarbonate, sulphate, bisulphate and metavanadate.

33. The catalyst of claim 13, wherein the water-soluble sodium compound is selected from sodium hydroxide, oxide, carbonate, bicarbonate, sulphate, bisulphate and metavanadate.

* * * * *